United States Patent
Stephan et al.

(10) Patent No.: US 11,848,636 B2
(45) Date of Patent: Dec. 19, 2023

(54) SKIP RAIL SYSTEM

(71) Applicant: PEGASUS SOLAR, INC., Richmond, CA (US)

(72) Inventors: Erich Kai Stephan, Richmond, CA (US); Glenn Harris, Sausalito, CA (US); Nicholas Wenzel, Richmond, CA (US); Peter Wilke, Richmond, CA (US)

(73) Assignee: PEGASUS SOLAR, INC., Richmond, CA (US)

( * ) Notice: Subject to any disclaimer, the term of this patent is extended or adjusted under 35 U.S.C. 154(b) by 353 days.

(21) Appl. No.: 16/889,635

(22) Filed: Jun. 1, 2020

(65) Prior Publication Data

US 2020/0389122 A1 Dec. 10, 2020

Related U.S. Application Data

(60) Provisional application No. 62/857,176, filed on Jun. 4, 2019.

(51) Int. Cl.
*H02S 20/23* (2014.01)
*F24S 25/61* (2018.01)
*F24S 25/67* (2018.01)

(52) U.S. Cl.
CPC .............. *H02S 20/23* (2014.12); *F24S 25/61* (2018.05); *F24S 25/67* (2018.05)

(58) Field of Classification Search
CPC . H02S 20/23; F24S 25/61; F24S 25/67; F24S 20/67; H01L 31/042
See application file for complete search history.

(56) References Cited

U.S. PATENT DOCUMENTS

| | | | |
|---|---|---|---|
| 2,394,729 A | 8/1944 | TInnerman |
| 2,712,917 A | 3/1951 | Flora et al. |
| 3,066,900 A | 12/1962 | Holton |
| 3,122,604 A | 2/1964 | Cook et al. |
| 3,145,753 A | 8/1964 | Kreider |
| 3,966,342 A | 6/1976 | Moriya |
| 4,159,758 A | 7/1979 | Courson |
| 4,269,043 A | 5/1981 | Kizu et al. |
| 4,285,379 A | 8/1981 | Kowalski |

(Continued)

FOREIGN PATENT DOCUMENTS

| | | |
|---|---|---|
| EP | 2239783 A1 | 10/2010 |
| EP | 3981029 | 4/2022 |

(Continued)

OTHER PUBLICATIONS

International Search Report and Written Opinion from the International Searching Authority, dated Aug. 18, 2020, 14 pages, for corresponding International Patent Application No. PCT/US2020/035874.

(Continued)

*Primary Examiner* — Andrew J Triggs
(74) *Attorney, Agent, or Firm* — POLSINELLI LLP

(57) ABSTRACT

A multi-rail system for mounting solar modules to a surface, such as a roof, uses two rails to support a first row of solar modules, and a single rail to support each subsequent row of solar modules. Splices connect edges of solar modules between rows, providing support along one edge of the solar modules for the subsequent rows.

24 Claims, 9 Drawing Sheets

(56) References Cited

U.S. PATENT DOCUMENTS

| | | | |
|---|---|---|---|
| 4,570,408 A | 2/1986 | Frascaroli et al. | |
| 4,729,706 A | 3/1988 | Peterson et al. | |
| 4,897,005 A | 1/1990 | Peterson et al. | |
| 4,907,388 A | 3/1990 | Siahatgar | |
| 4,950,841 A | 8/1990 | Walker et al. | |
| 5,144,780 A | 9/1992 | Gieling et al. | |
| 5,203,135 A | 4/1993 | Bastian | |
| D353,209 S | 12/1994 | Dallaire et al. | |
| 5,423,646 A | 6/1995 | Gagnon | |
| 5,489,173 A | 2/1996 | Hofle | |
| 5,596,237 A | 1/1997 | Daniels | |
| 5,657,604 A | 8/1997 | Malott | |
| 5,713,707 A | 2/1998 | Gagnon | |
| 6,205,719 B1 | 3/2001 | Bruce | |
| 6,568,873 B1 | 5/2003 | Peterson | |
| 6,874,971 B2 | 4/2005 | Albaugh | |
| 7,077,855 B2 | 7/2006 | Curtis | |
| 7,568,855 B2 | 8/2009 | Fitzler et al. | |
| 7,832,180 B2 | 11/2010 | Dolby | |
| 7,866,098 B2 | 1/2011 | Cinnamon | |
| 8,375,661 B1 | 2/2013 | diGirolamo et al. | |
| 8,387,319 B1 | 3/2013 | Gilles-Gagnon et al. | |
| 8,567,030 B2 | 10/2013 | Koch et al. | |
| 8,656,658 B2 * | 2/2014 | Shufflebotham | H02S 30/10 52/173.3 |
| 8,695,290 B1 | 4/2014 | Kim et al. | |
| 8,893,445 B2 | 11/2014 | Yen | |
| 8,919,075 B2 * | 12/2014 | Erickson | H02S 40/10 52/173.3 |
| 8,935,893 B2 * | 1/2015 | Liu | F24S 25/61 52/173.3 |
| 8,938,932 B1 | 1/2015 | Wentworth et al. | |
| D732,698 S | 6/2015 | Meng | |
| 9,121,433 B1 | 9/2015 | Bacon | |
| 9,181,705 B2 | 11/2015 | Lanza | |
| 9,249,813 B2 | 2/2016 | Kalman | |
| 9,267,529 B2 | 2/2016 | Tejero Salinero | |
| 9,350,288 B2 * | 5/2016 | Hardikar | H02S 20/23 |
| 9,447,988 B2 | 9/2016 | Stearns et al. | |
| 9,473,066 B2 | 10/2016 | Stephan et al. | |
| 9,531,319 B2 | 12/2016 | Braunstein et al. | |
| 9,590,405 B1 | 3/2017 | Maurer | |
| 9,590,406 B1 | 3/2017 | Maurer | |
| 9,705,299 B1 | 3/2017 | Maurer et al. | |
| 9,689,411 B2 | 6/2017 | Meine et al. | |
| 9,819,303 B2 | 11/2017 | Ash | |
| 9,837,954 B2 | 12/2017 | Ash | |
| 9,893,677 B1 | 2/2018 | Liu | |
| 10,097,133 B2 * | 10/2018 | Aliabadi | F24S 25/636 |
| 10,205,418 B2 | 2/2019 | Nayar | |
| 10,211,775 B1 * | 2/2019 | Wentworth | F24S 25/636 |
| 10,218,305 B1 | 2/2019 | Schrock | |
| 10,270,383 B2 * | 4/2019 | Wildes | F24S 25/636 |
| 10,288,319 B2 | 5/2019 | Li et al. | |
| 10,305,415 B2 | 5/2019 | McPheeters et al. | |
| 10,472,828 B2 | 11/2019 | Stearns et al. | |
| 10,749,459 B1 | 8/2020 | Liu et al. | |
| 10,847,960 B1 | 11/2020 | Naugler et al. | |
| 10,914,513 B1 | 2/2021 | Dhage et al. | |
| 11,143,436 B1 | 10/2021 | Stephan et al. | |
| 11,296,648 B1 | 4/2022 | Jasmin et al. | |
| 11,313,591 B1 | 4/2022 | Atia | |
| 11,336,222 B1 | 5/2022 | Garza et al. | |
| 11,463,040 B2 | 10/2022 | Affentranger, Jr. | |
| 11,486,434 B2 | 11/2022 | Kovacs et al. | |
| D1,004,141 | 11/2023 | Stephan et al. | |
| 2007/0248434 A1 | 10/2007 | Wiley et al. | |
| 2008/0310913 A1 | 12/2008 | Urban et al. | |
| 2009/0114269 A1 | 5/2009 | Fletcher et al. | |
| 2010/0202853 A1 | 8/2010 | Merhar et al. | |
| 2010/0281793 A1 | 11/2010 | McPheeters et al. | |
| 2011/0001030 A1 | 1/2011 | Hochreiter et al. | |
| 2011/0194886 A1 | 8/2011 | Wu et al. | |
| 2011/0240101 A1 | 10/2011 | Sagayama et al. | |
| 2011/0253859 A1 | 10/2011 | Ostermeier et al. | |
| 2012/0097207 A1 | 4/2012 | Shufflebotham et al. | |
| 2013/0121760 A1 | 5/2013 | Chen et al. | |
| 2013/0200234 A1 | 8/2013 | Zhao et al. | |
| 2013/0291479 A1 | 11/2013 | Schaefer et al. | |
| 2014/0000681 A1 | 1/2014 | Zhao et al. | |
| 2014/0014163 A1 | 1/2014 | McCarthy et al. | |
| 2014/0026946 A1 | 1/2014 | West et al. | |
| 2014/0042286 A1 | 2/2014 | Jaffari | |
| 2014/0079510 A1 | 3/2014 | Suzuki et al. | |
| 2014/0102517 A1 | 4/2014 | Meine et al. | |
| 2014/0154908 A1 | 6/2014 | Magno et al. | |
| 2014/0165499 A1 | 6/2014 | Vanker et al. | |
| 2014/0220834 A1 | 8/2014 | Rizzo | |
| 2014/0353435 A1 | 12/2014 | Liu et al. | |
| 2015/0101997 A1 | 4/2015 | Liu et al. | |
| 2015/0102194 A1 | 4/2015 | Liu | |
| 2015/0180404 A1 | 6/2015 | Braunstein et al. | |
| 2015/0226246 A1 | 8/2015 | Kirchner | |
| 2015/0311606 A1 | 10/2015 | Meine et al. | |
| 2015/0316086 A1 | 11/2015 | Urban et al. | |
| 2015/0357773 A1 | 12/2015 | Schirmeier | |
| 2015/0381106 A1 | 12/2015 | Fujikawa et al. | |
| 2016/0006390 A1 | 1/2016 | Cinnamon et al. | |
| 2016/0043687 A1 | 2/2016 | McPheeters et al. | |
| 2016/0069592 A1 | 3/2016 | Giraudo et al. | |
| 2016/0087576 A1 | 3/2016 | Johansen et al. | |
| 2016/0111996 A1 | 4/2016 | Stephan et al. | |
| 2016/0156169 A1 | 6/2016 | Jaena et al. | |
| 2016/0282018 A1 | 6/2016 | Ash et al. | |
| 2016/0268958 A1 | 9/2016 | Wildes et al. | |
| 2016/0285408 A1 | 9/2016 | Ash et al. | |
| 2016/0329671 A1 | 11/2016 | Kokenda et al. | |
| 2017/0033730 A1 | 2/2017 | Almy et al. | |
| 2017/0063301 A1 | 3/2017 | Ash | |
| 2017/0133977 A1 | 5/2017 | Tripp et al. | |
| 2017/0146041 A1 | 5/2017 | Schaefer et al. | |
| 2017/0170579 A1 | 6/2017 | Martin | |
| 2017/0201080 A1 | 7/2017 | Maurer et al. | |
| 2017/0233996 A1 | 8/2017 | Abernathy et al. | |
| 2017/0237386 A1 | 8/2017 | Stephan et al. | |
| 2017/0366131 A1 | 12/2017 | Stearns et al. | |
| 2018/0062561 A1 | 3/2018 | Kapla et al. | |
| 2018/0076605 A1 | 3/2018 | Garcia | |
| 2018/0091091 A1 | 3/2018 | Rossi | |
| 2018/0094418 A1 | 4/2018 | Winter | |
| 2018/0245331 A1 | 8/2018 | Tang et al. | |
| 2018/0367093 A1 | 12/2018 | Ayers et al. | |
| 2019/0068110 A1 | 2/2019 | McPheeters | |
| 2019/0154306 A1 | 5/2019 | Rothschild | |
| 2019/0178274 A1 | 6/2019 | Katz | |
| 2019/0211543 A1 | 7/2019 | Abernathy et al. | |
| 2019/0326847 A1 | 10/2019 | Zuritis | |
| 2020/0056370 A1 | 2/2020 | Hebiishi et al. | |
| 2020/0389122 A1 * | 12/2020 | Stephan | H02S 30/00 |
| 2020/0403559 A1 | 12/2020 | Kresse et al. | |
| 2021/0067083 A1 | 3/2021 | Stephan | |
| 2021/0156135 A1 | 5/2021 | Stephan et al. | |
| 2021/0156413 A1 | 5/2021 | Stephan | |
| 2021/0194158 A1 | 6/2021 | Ash et al. | |
| 2022/0190781 A1 | 6/2022 | Stephan | |
| 2022/0239247 A1 | 7/2022 | Stephan | |
| 2022/0263458 A1 | 8/2022 | Stephan | |
| 2022/0298776 A1 | 9/2022 | Stephan | |
| 2023/0178904 A1 | 6/2023 | Stephan et al. | |
| 2023/0204972 A1 | 6/2023 | Wu et al. | |
| 2023/0287674 A1 | 9/2023 | Stephan et al. | |

FOREIGN PATENT DOCUMENTS

| | | |
|---|---|---|
| EP | 4022765 | 7/2022 |
| WO | WO 2020/247463 | 12/2020 |
| WO | WO 2021/041408 | 3/2021 |
| WO | WO 2021/108492 | 6/2021 |
| WO | WO 2021/108696 | 6/2021 |
| WO | WO 2021/119458 | 6/2021 |

(56) References Cited

FOREIGN PATENT DOCUMENTS

| WO | WO 2022/132135 | 6/2022 |
|----|----------------|--------|
| WO | WO 2022/159122 | 7/2022 |

OTHER PUBLICATIONS

PCT Application No. PCT/US2020/035874, International Preliminary Report on Patentability dated Dec. 7, 2021.
PCT Application No. PCT/US2020/047792, International Preliminary Report on Patentability dated Mar. 1, 2022.
PCT Application No. PCT/US2020/047792, International Search Report and Written Opinion dated Nov. 9, 2020.
PCT Application No. PCT/US2020/065160, International Search Report and Written Opinion dated Apr. 20, 2021.
PCT Application No. PCT/US2020/062151, International Preliminary Report on Patentability dated May 17, 2022.
PCT Application No. PCT/US2020/062151, International Search Report and Written Opinion dated Feb. 17, 2021.
PCT Application No. PCT/US2020/062406, International Preliminary Report on Patentability dated May 17, 2022.
PCT Application No. PCT/US2020/062406, International Search Report and Written Opinion dated Mar. 30, 2021.
PCT Application No. PCT/US2021/020708, International Search Report and Written Opinion dated Jul. 21, 2021.
U.S. Appl. No. 17/001,357, Office Action dated Jun. 3, 2022.
U.S. Appl. No. 17/120,534, Office Action dated May 26, 2021.
U.S. Appl. No. 17/118,771, Final Office Action dated Nov. 7, 2022.
U.S. Appl. No. 17/118,771, Office Action dated Aug. 11, 2022.
U.S. Appl. No. 17/155,624 Office Action dated May 26, 2022.
U.S. Appl. No. 17/834,7744 Office Action dated Nov. 10, 2022.
European Patent Office, Application No. 20819161.9, Supplementary Search Report, Apr. 20, 2023, 8 pages.
PCT Application No. PCT/US2022/052152, International Search Report and Written Opinion dated Mar. 28, 2023.
European Patent Office, Application No. 20893136.0, European Search Report dated Aug. 2, 2023, 5 pages.

* cited by examiner

SKIP RAIL SYSTEM

CROSS-REFERENCE TO RELATED APPLICATION

This application claims the benefit of U.S. Provisional Application No. 62/857,176 entitled "SKIP RAIL SYSTEM," filed on Jun. 4, 2019, the full disclosure of which incorporated herein in its entirety.

BACKGROUND

Current solar mounting solutions using rails as mounting structure require two rails per each row of solar modules. Each row takes additional time to install and increases the number of roof penetrations, which in turn increases installation labor and the risk of a roof leak. A solution which reduces the number of rows of rails is beneficial for time and cost savings along with risk reduction.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
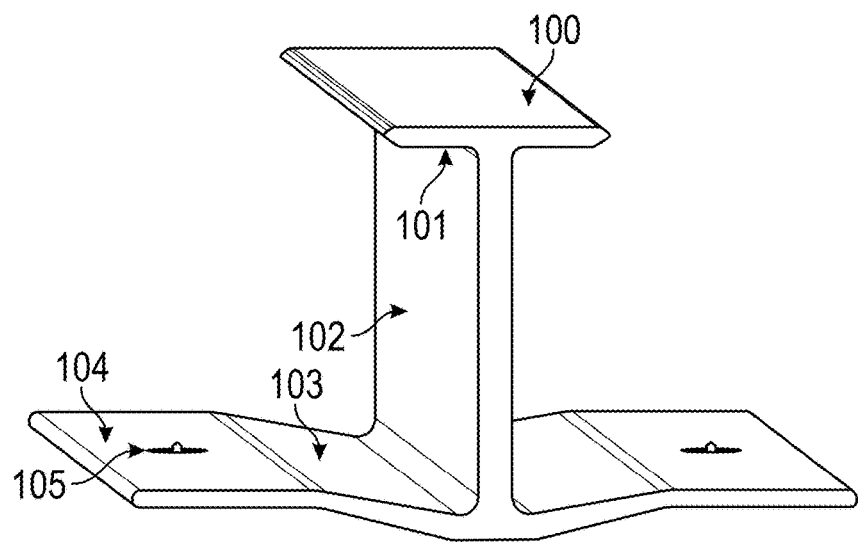
FIG. 1A illustrates an isometric view of a Skip rail splice.

FIG. 1A depicts an isometric view of the skip rail splice 100. The skip rail splice 100 is comprised of two horizontal members 101 extending from center vertical member 102. Extending from bottom of vertical member 102 are angled members 103 which are at an angle between 0-90 degrees from the vertical member 102. The angled members 103 transition to bottom flanges 104 which may be substantially parallel to top horizontal members 101 or may be at an angle relative to top horizontal members 101. There may be one or more apertures on the face of bottom flanges 104 which may have a bond pin 105 inserted. The bond pin 105 serves the purpose of making electrical bonding connection to the solar module upon installation into the skip rail splice 100.

Figure 1B:
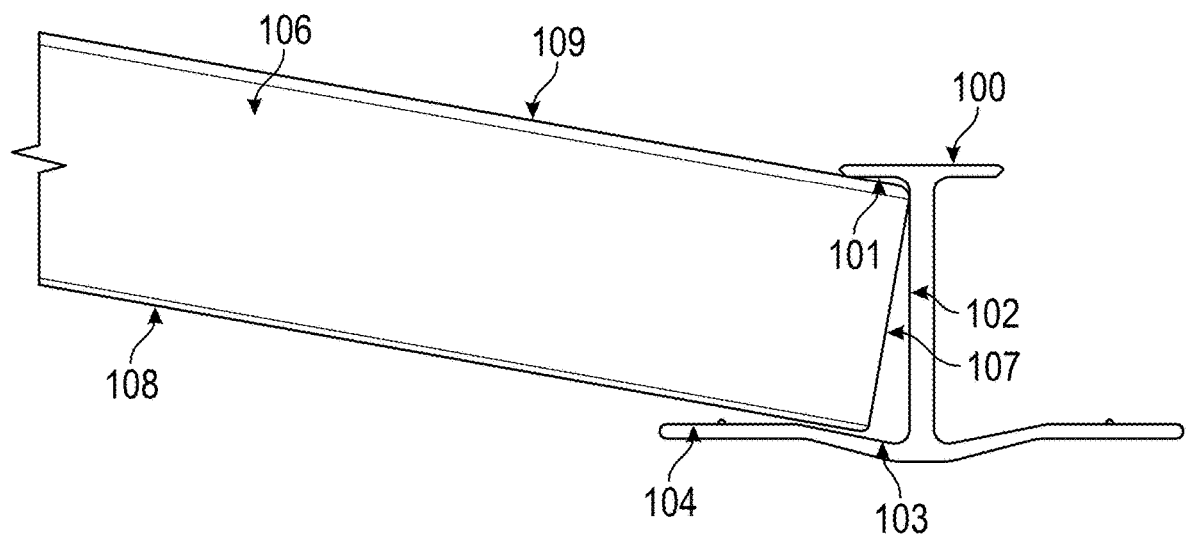
FIG. 1B illustrates a Skip rail splice and a solar module being installed.

FIG. 1B depicts a solar module 106 being installed into a skip rail splice 100 from a side view. The solar module 106 may be inserted with the bottom edge 108 at angle relative to bottom flanges 104. The solar module 106 may then be angled down so that bottom edge 108 is substantially parallel with top horizontal member 101.

Figure 1C:
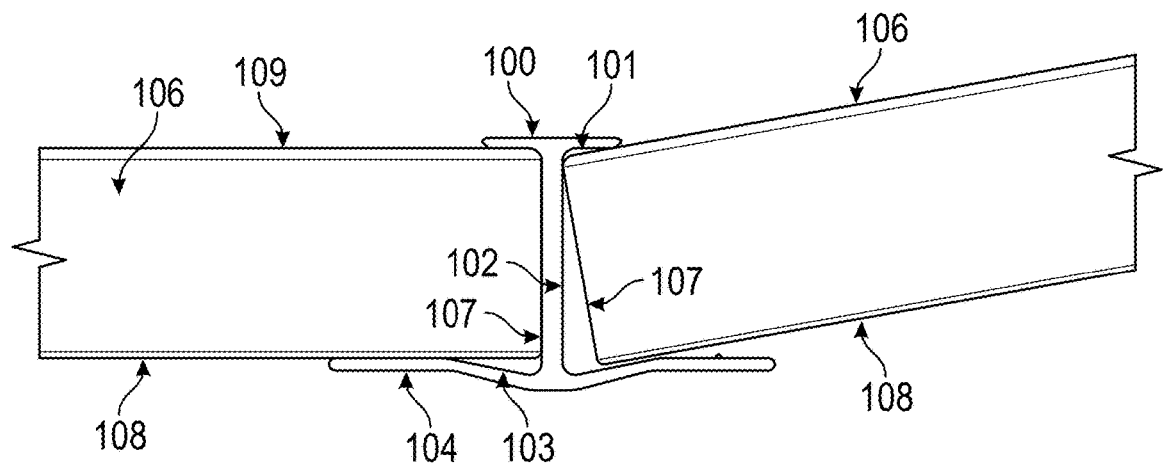
FIG. 1C illustrates a Skip rail splice with a solar module installed on one side and another in process of being installed.

FIG. 1C depicts one solar module 106 on the left side in its final installation state where the top edge 109 of solar module 106 is in contact with top horizontal member 101. Leading edge 107 is coincident or in proximity with vertical member 102. Bottom edge 108 may be in contact with bottom flange 104. When the first solar module 106 is in the lowered position shown in FIG. 1C, the bottom flange 104 and the top horizontal member 101 may compress the frame of solar module 106 sufficiently to secure the solar module 106 from typical forces. In this example embodiment, the vertical distance between the top horizontal member 101 and the bottom flange 104 is slightly less than the vertical height of the frame of the solar module 106 in order to create a clamping force. The second solar module 106 on the right edge of skip rail splice 100 is mid-installation in substantially the same process as the left first solar module of FIG. 1B.

Figure 1D:
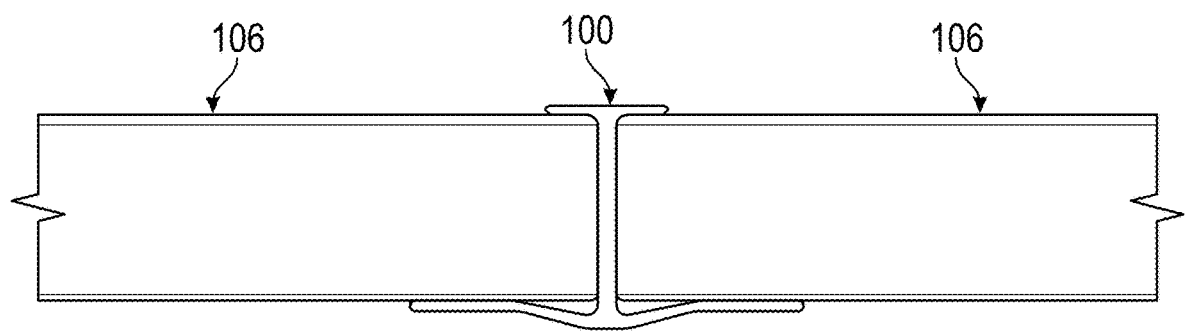
FIG. 1D illustrates a Skip rail splice and solar module assembly in final assembly state, side profile.

FIG. 1D depicts both solar modules 106 in their final install state with skip rail splice 100. In this example embodiment, the first and second solar modules 106 are substantially parallel with one another, and substantially parallel with the horizontal member 104 of the skip rail splice 100.

Figure 2A:
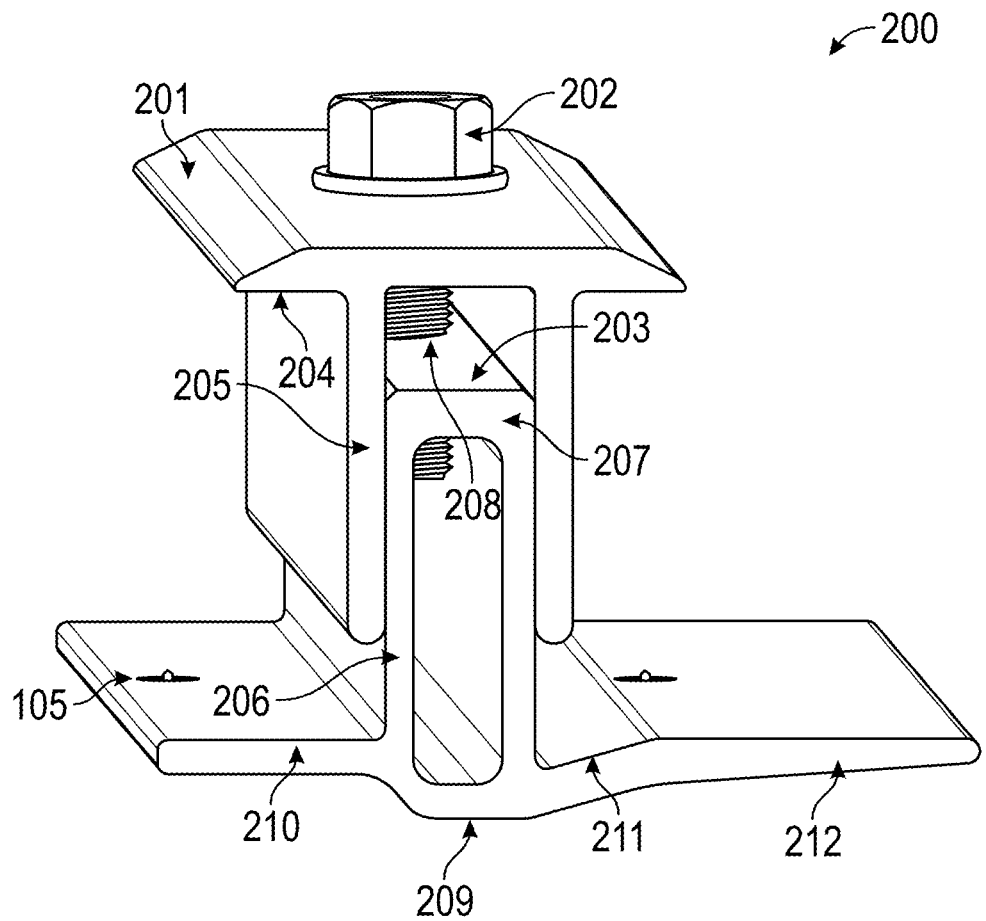
FIG. 2A illustrates an isometric view of an alternative embodiment of a Skip rail splice.

FIG. 2A depicts an isometric view of an alternative embodiment of the skip rail splice 200. The skip rail splice 200 is comprised of a top piece 201, bottom piece 203, and a fastener 202. The top piece 201 has horizontal members 204 protruding from a main body comprised of two vertical members 205 which have a "U" shape with opening at the bottom. The material between horizontal members 201 may have an aperture for fastener 202 to pass through. The bottom piece 203 of the assembly may be comprised of two vertical members 206 with a space between the two outer walls less than the width of the space between the two inner members 205 of the top piece 201. These two vertical members 206 are connected at the top by a horizontal member 207 and at the bottom with a horizontal member 209. Member 207 may have a threaded aperture 208 for receiving threaded fastener 202 which when turned, threadably tightens top piece 201 in the downward direction bringing horizontal members 204 closer to horizontal members 210 and 212 of the bottom piece 203. There may be one or more apertures on the face of horizontal members 210 and 212 which may have a bond pin 105 inserted inside said aperture. The bond pin 105 serves the purpose of making electrical bonding connection to the solar module which will be installed into the Skip rail splice 200.

Figure 2B:
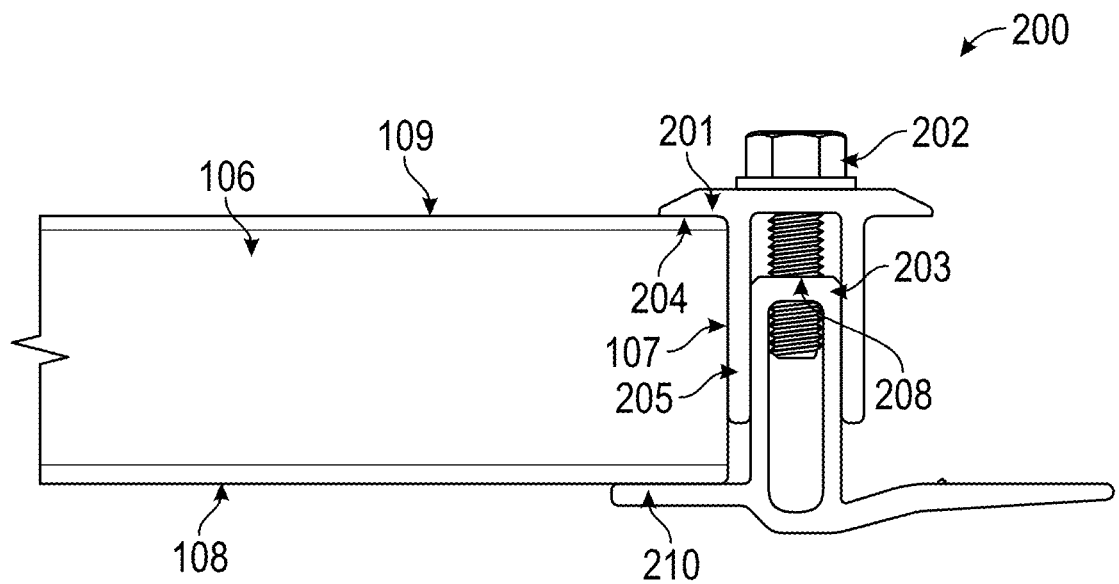
FIG. 2B illustrates an alternative embodiment of a Skip rail splice and a solar module being installed.

FIG. 2B depicts a first solar module 106 on the left side in its final installation state where the top edge 109 of solar module 106 is in contact with horizontal member 204.

Leading edge 107 is in contact with vertical member 205. Bottom edge 108 is in contact with horizontal member 210. When solar module 106 is in the position shown the fastener 202 is threadably tightened to secure or clamp the solar module between top piece 201 and bottom piece 203.

Figure 2C:
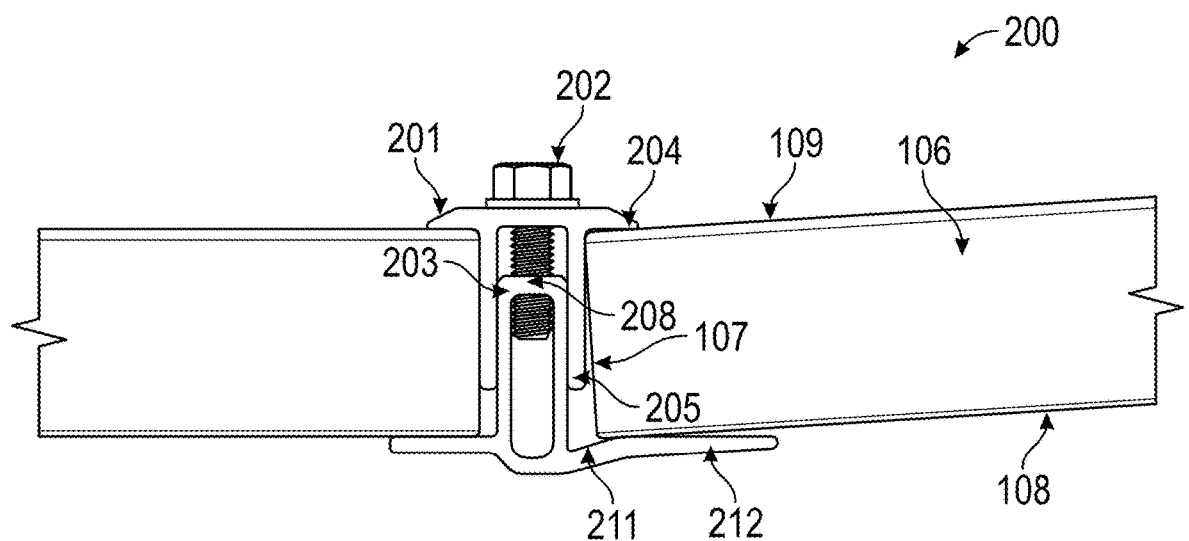
FIG. 2C illustrates an alternative embodiment of a Skip rail splice with a solar module installed on one side and another in process of being installed.

FIG. 2C depicts a solar module 106 being installed into the right side of skip rail splice 200 from a side view. The solar module 106 may be inserted with the bottom edge 108 at an angle similar to the angled member 211. Once the corner edge, between top edge 109 and leading edge 107, is positioned in contact or substantially close with vertical member 205, the solar module 106 may be angled down into its final install state shown in FIG. 2D.

Figure 2D:
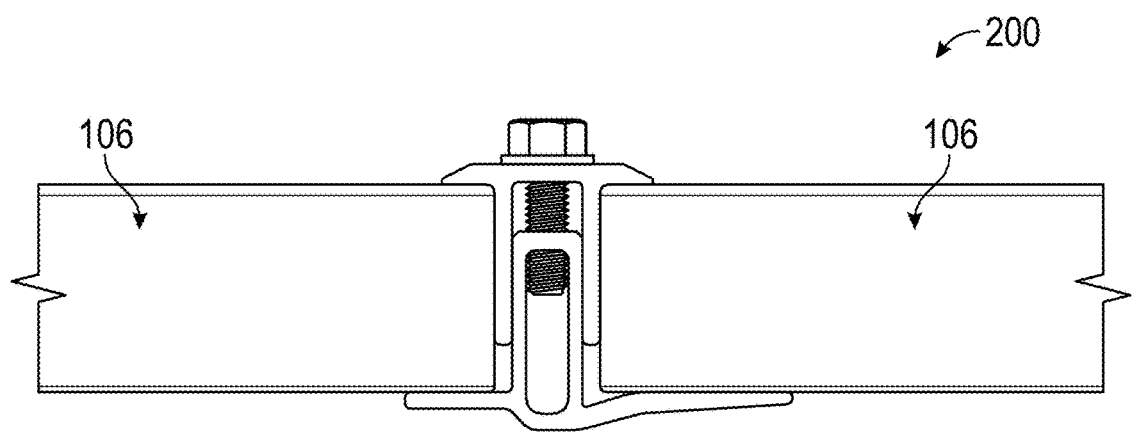
FIG. 2D illustrates an alternative embodiment of a Skip rail splice and solar module assembly in final assembly state, side profile.

FIG. 2D depicts both solar modules 106 in their final install state with skip rail splice 200.

Figure 3:
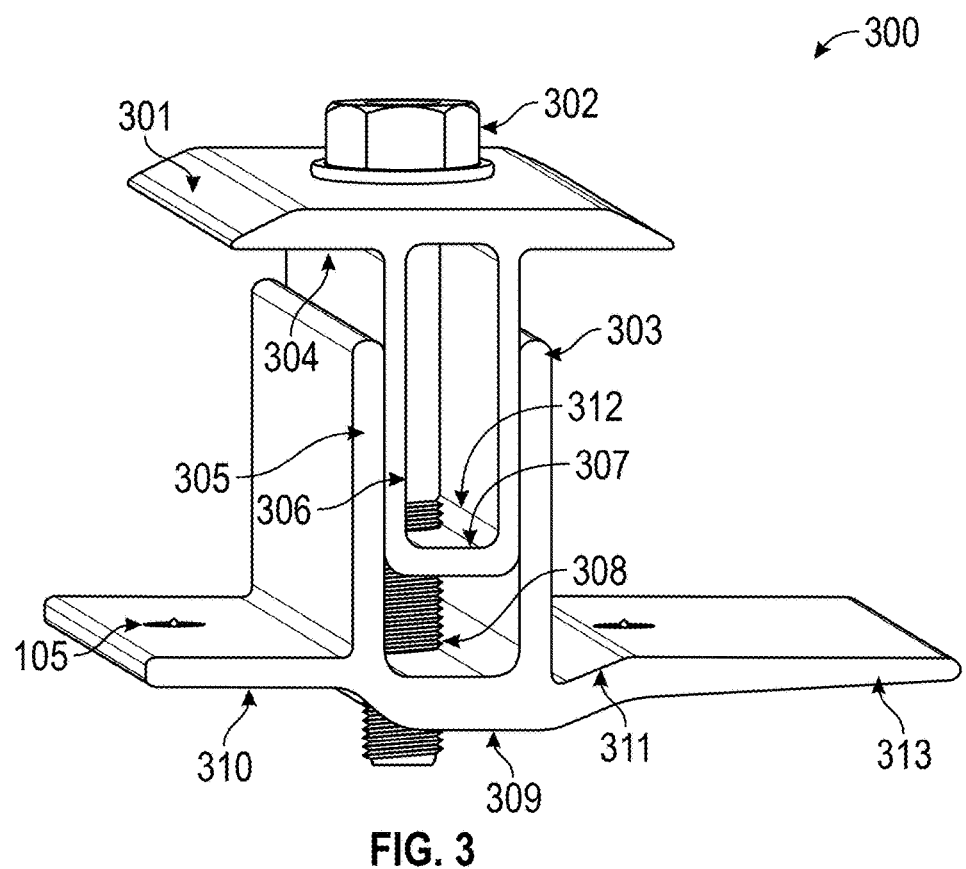
FIG. 3 illustrates an isometric view of another alternative embodiment of a Skip rail splice.

FIG. 3 depicts an isometric view of an alternative embodiment of the skip rail splice 300. The skip rail splice 300 is comprised of a top piece 301, bottom piece 303, and a fastener 302. The top piece 301 has horizontal members 304 protruding from a main body comprised of two vertical members 306 and third member 307 connecting the two. The bottom member 307 may have an aperture 312 for fastener 302 to pass through. The bottom piece 303 of the assembly may be comprised of two vertical members 305 with a space between the two inner walls greater than the width of the two outer members 306 of the top piece 301. These two vertical members 305 are connected by a third member 309, creating a "U" shape. The third member 309 may have a threaded aperture for receiving threaded fastener 302 which when turned, threadably tightens or clamps top piece 301 in the downward direction bringing horizontal members 304 closer to horizontal members 310 and 313 of the bottom piece 303. There may be one or more apertures on the face of horizontal members 310 and 313 which may have a bond pin 105 inserted inside said aperture. The bond pin 105 serves the purpose of making electrical bonding connection to the solar module which will be installed into the skip rail splice 300.

FIGS. 4 through 11 show installation examples of a system of skip rail splices 100. These example systems are possible with the example embodiments shown in FIGS. 1 through 3. Typical solar installation systems require two rows of rails per row of solar modules 106, but in utilizing a skip rail splice 100, the array of solar modules often only requires one row of rails for solar module rows two and above within a solar array.

Figure 4:
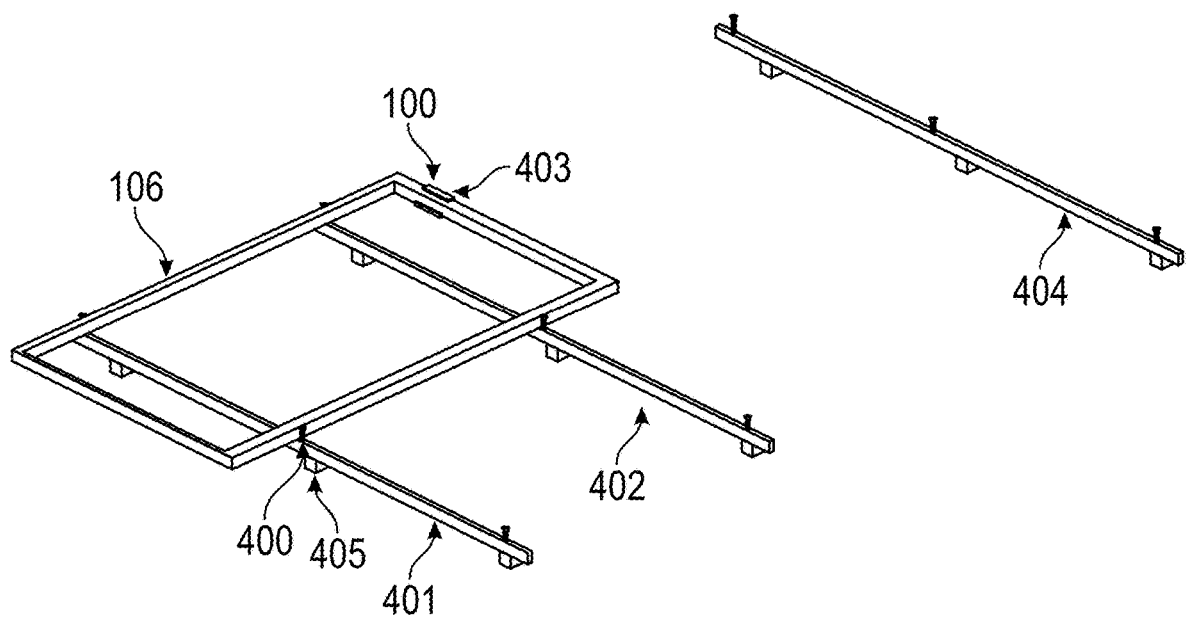
FIGS. 4-11 illustrate embodiments of a system of Skip rail splices.

FIG. 4 is an example embodiment of the present invention depicting a solar module 106 installed in a portrait orientation on a first rail 401 and a second rail 402. The first rail 401, second rail 402, and third rail 404 are all attached to a roof surface using a mount 405. The solar module 106 is secured to the first rail 401 and second rail 402 by clamps 400 at each of the four locations where the frame of the solar module 106 contacts the rails. A first skip rail splice 100 is positioned at row-end splice location 403. In this example embodiment, a first rail 401 is positioned within the first half of a solar module 106, and the second rail 402 is positioned substantially parallel with the first rail 401 in the second half of solar module 106. For a second row of solar modules (not shown), a third rail 404 is positioned substantially parallel to the first two rails, in a position that would align in the farthest half of a to-be-installed solar module above the first solar module 106. In this example embodiment, there is no rail positioned in the lower half of a solar module in the second row of the array.

Figure 5:
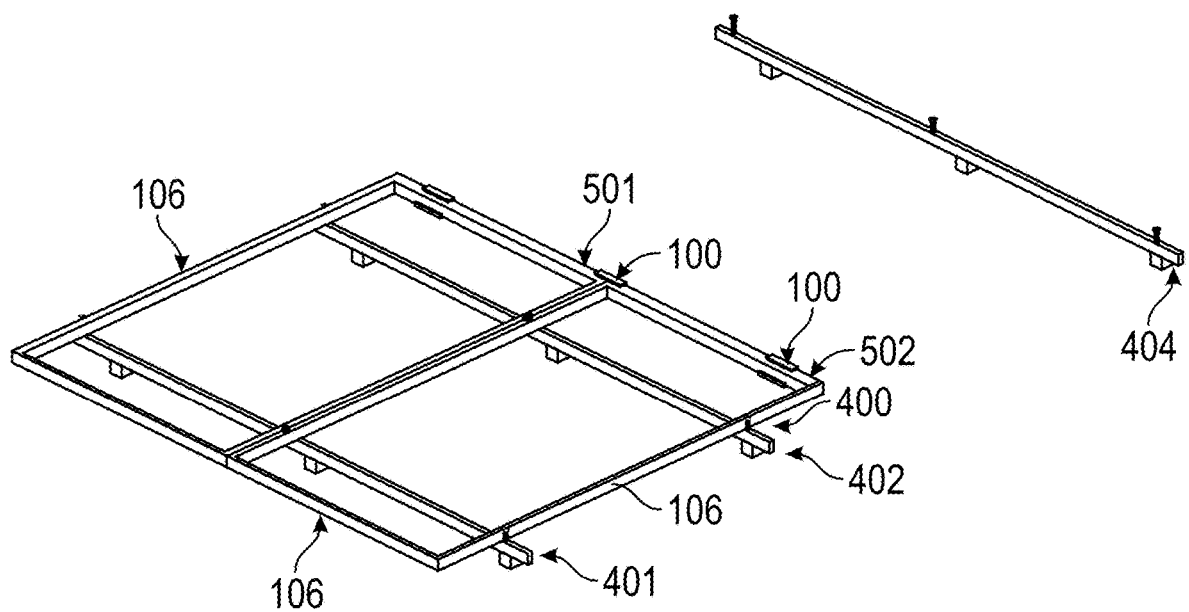

FIG. 5 depicts a possible next step in the installation of the array of solar modules 106. One or more solar modules 106 are attached in the same row as the first solar module 106 to rails 401 and 402. On the top edge of the solar modules 106, a skip rail splice 100 is attached. One or more skip rail splices 100 are attached per solar module 106 along length of top edge and there may be a skip rail splice 100 that is attached to two solar modules 106 at mid-row splice location 501. A third skip rail splice 100 is located at the right edge of a right-end splice location 502. In other example embodiments, a row of solar modules 106 may have a skip rail splice 100 at multiple mid-row splice locations 501.

Figure 6:
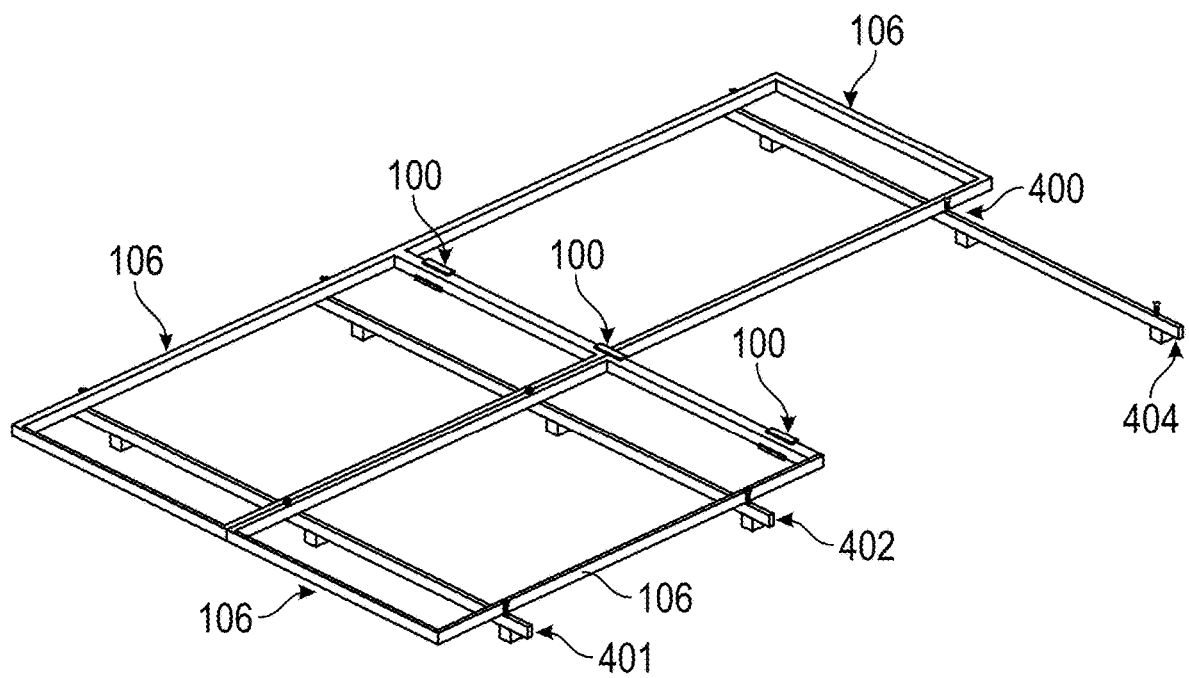

FIG. 6 depicts a possible next step in the installation of the array of solar modules 106. A solar module 106 is installed above first row of solar modules 106. The bottom edge of the solar module 106 is installed into the top edge of one or more skip rail splices 100 which were installed on top edge of solar modules in the previous step shown in FIG. 5. The example method of installing solar module 106 into skip rail splice 100 can be seen in the depiction in FIGS. 1C-1D and FIGS. 2C-2D. Next, the sides of the frame on module 106 are secured to the third rail 404 with clamp(s) 400.

Figure 7:
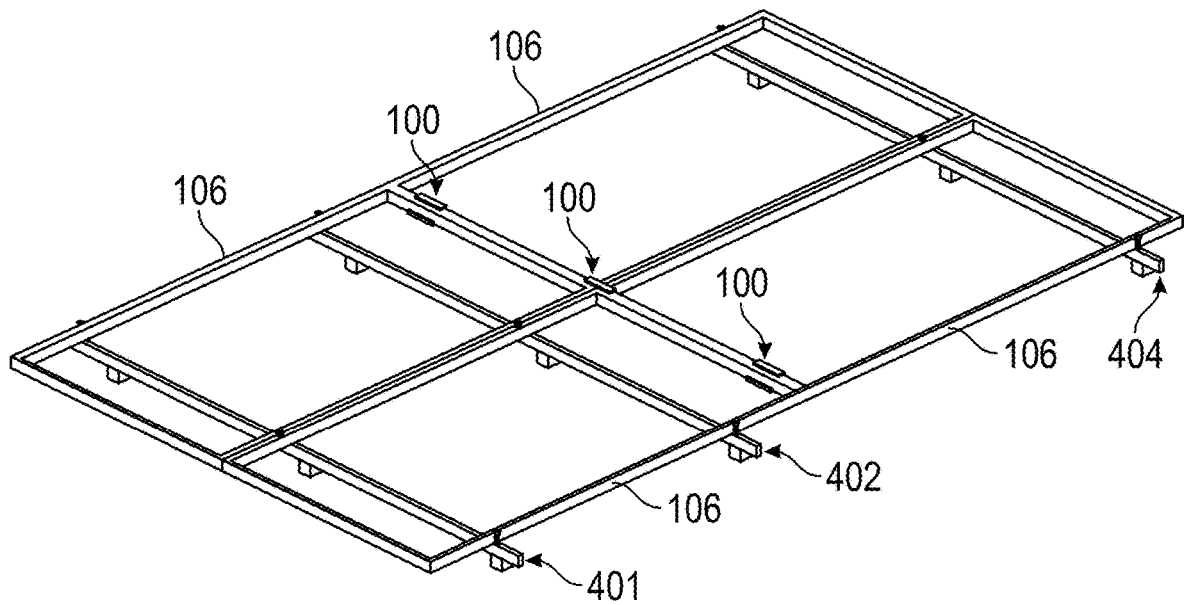

FIG. 7 depicts a possible next step in the installation of the array of solar modules 106. One or more solar modules 106 are installed in the second row next to the first solar modules 106 shown in FIG. 6. These solar modules 106 are installed in substantially the same process as described in previous steps, including the example method depicted in FIGS. 1C-1D and FIGS. 2C-2D. The bottom edge of the solar module 106 may install into the top edge of a skip rail splice 100 shared with a module in the same row immediately to the left or right. If the solar module 106 is the outermost solar module of the row in the array, it may be the only solar module 106 installed into the top edge of a skip rail splice 100 located in an end splice location 502.

Figure 8:
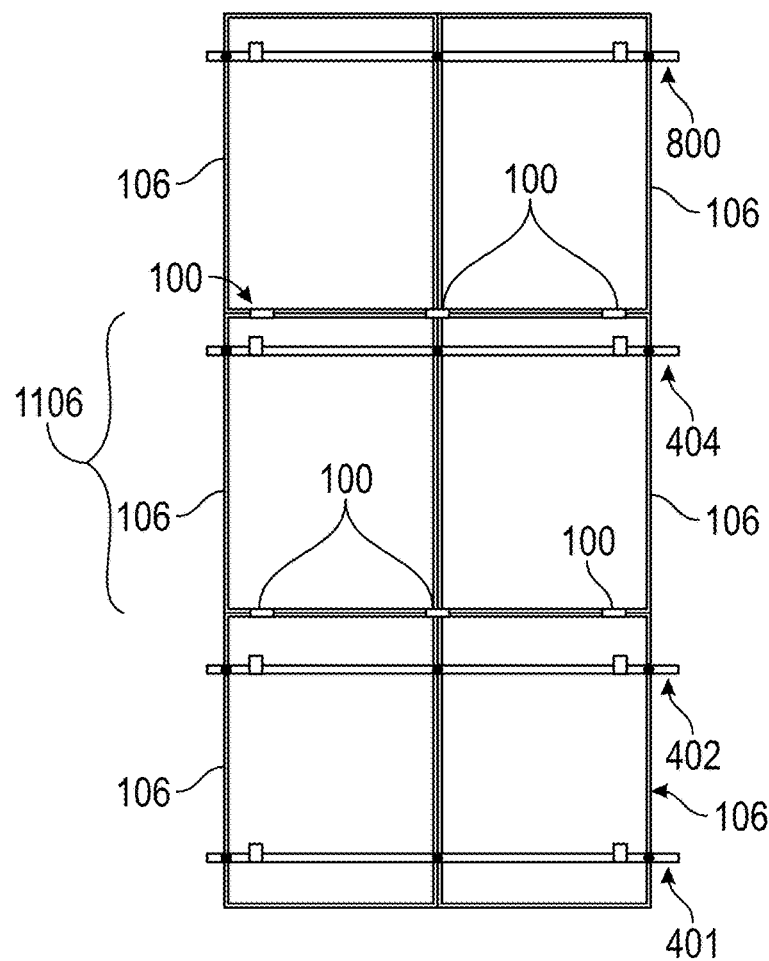

FIG. 8 depicts an example embodiment from an overhead view showing a solar module array with three rows of 2 solar modules each. In this example embodiment of the present invention, the three rows of solar modules 106 employ 4 rows for rails and two rows of skip rail splices 100. In this example embodiment, a first rail 401 is positioned within the first half of a solar module 106, and the second rail 402 is positioned substantially parallel with the first rail 401 in the second half of the same solar module 106. For a second row of solar modules 106, a third rail 404 is positioned substantially parallel to the first two rails, in a position that aligns it in the farthest half of the second row of solar modules 106 above the first row of solar modules 106. In this example embodiment, there is no rail positioned in the lower half of the solar modules 106 in the second row of the array. A fourth rail 800 is positioned substantially parallel to the first three rails, in a position that would align in the farthest half of the third row of solar modules 106. In this example embodiment, there is no rail positioned in the lower half of the solar modules 106 in the third row of the array. As depicted, the spacing between the second rail 402 and the third rail 404, and the spacing between the third rail 404 and the fourth rail 800, generally correspond to the length of the longer edge 1106 of the second row of solar modules.

Figure 9:
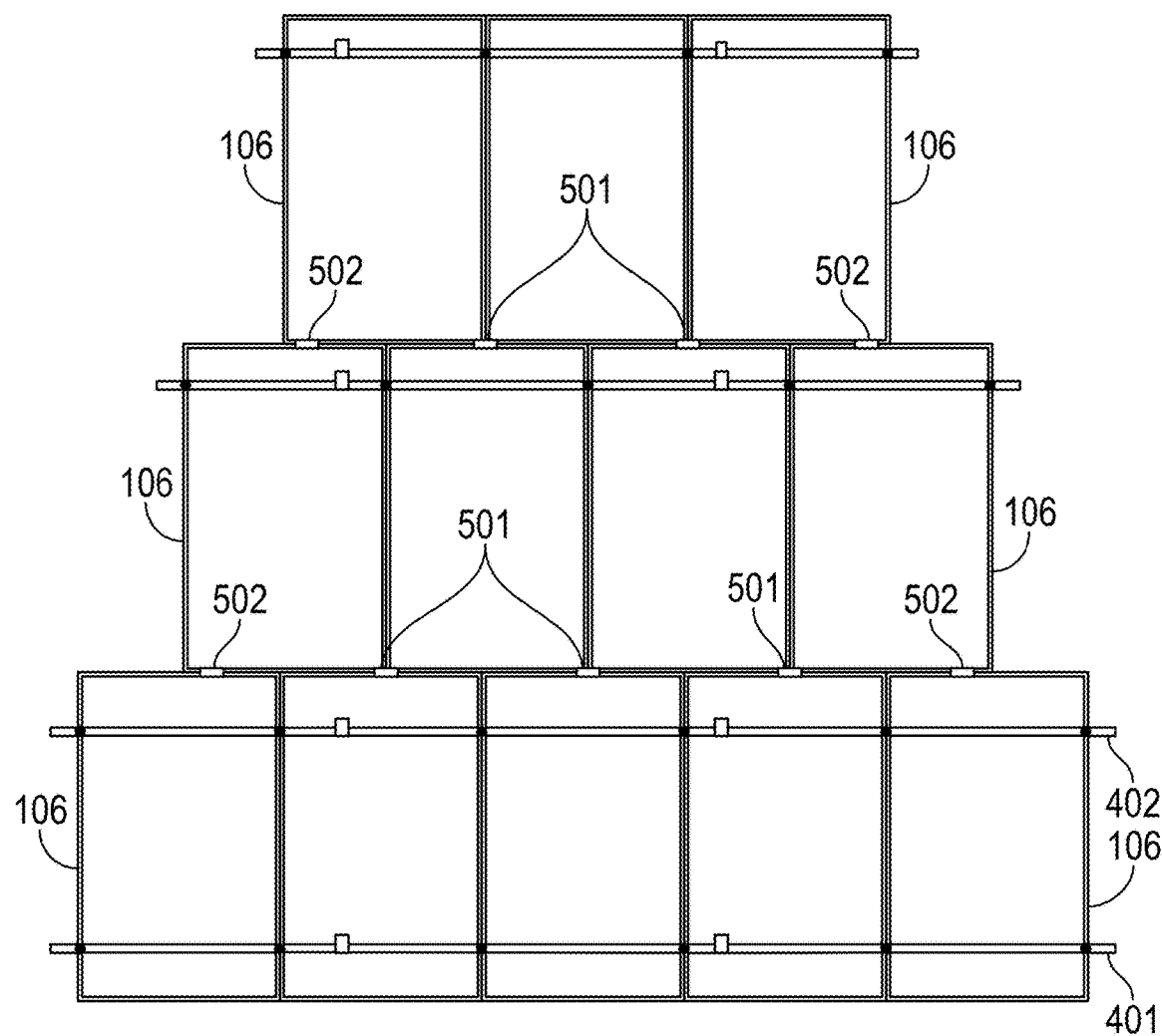

FIG. 9 depicts an example embodiment of an array of solar modules 106 with different numbers of solar modules 106 in the different rows of the array. Between each of the rows of solar modules 106 there is a row of skip rail spices 100 which may have two skip rail splices 100 in row-end splice locations 502 and multiple skip rail splices 100 in mid-row splice locations 501. Each of these skip rail splices 100 may attach to two, three, or four solar modules 106. As depicted, the skip rail splices 100 that are positioned in mid-row splice locations 501 are positioned to connect one solar module 106 in the solar module row below the skip rail splice 100 and two solar modules 106 in the solar module row above the skip rail splice 100. Skip rail splices 100 that are positioned in row-end splice locations 502 connect one solar module 106 from the row above and one solar module 106 from the row below skip rail splice 100. FIG. 9 depicts an example embodiment of an array of solar modules where alignment of the modules alternates from one row to the next, and the number of modules in each row decreases for each added row.

Figure 10:
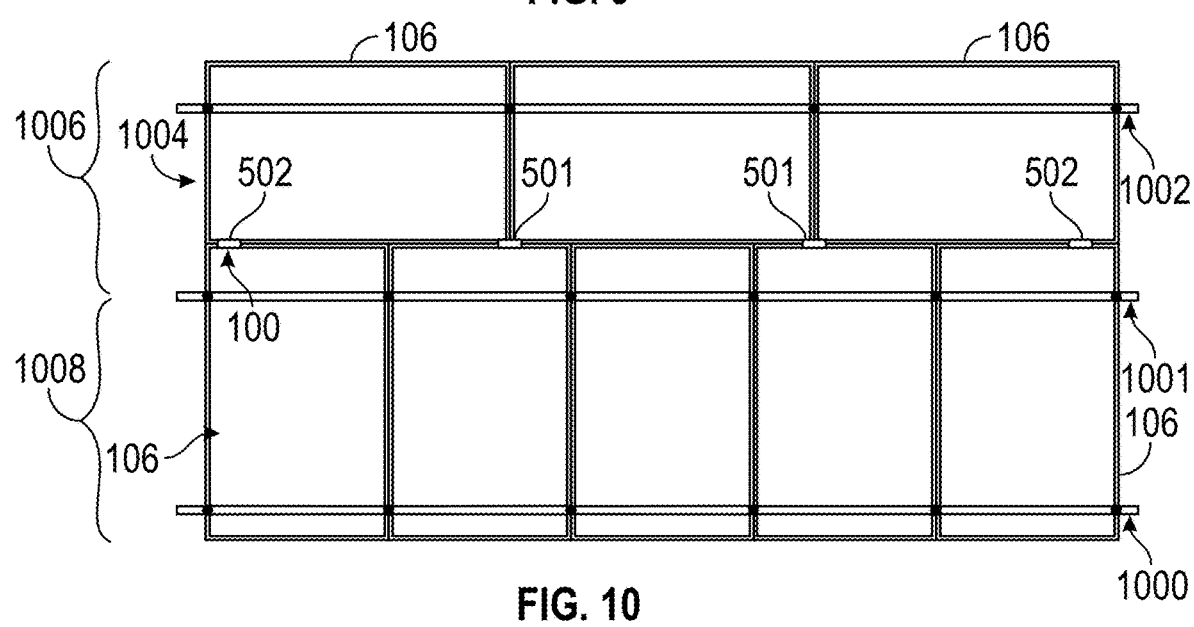

FIG. 10 depicts an example embodiment of an array of solar modules of mixed landscape 1006 and portrait 1008 orientations. Between the rows of solar modules 106 there is a row of skip rail spices 100 which may have two skip rail splices 100 in row-end splice locations 502 and multiple skip rail splices 100 in mid-row splice locations 501. Each of these skip rail splices 100 may attach to two, three, or four solar modules 106. In this example embodiment, a first rail 1000 is positioned within the first half of a solar module 106, and the second rail 1001 is positioned substantially parallel with the first rail 1000 in the second half of solar module 106. For the second row of solar modules 106 in landscape 1006 orientation, a third rail 1002 is positioned substantially parallel to the first two rails, in a position that aligns it in the farthest half of the edge of a row of solar modules 106 above the first row of solar modules 106. In this example embodiment, there is no rail positioned in the lower half of the solar modules 106 in the second row of the array. The spacing between the second rail 1001 and the third rail 1002 generally corresponds to the length of the shorter edge 1004 of the second row of solar modules. As depicted, the skip rail splices 100 that are positioned in mid-row splice locations 501 are positioned to connect one solar module 106 in the solar module row below the skip rail splice 100 and two solar modules 106 in the solar module row above the skip rail splice 100. Skip rail splices 100 that are positioned in row-end splice locations 502 connect one solar module 106 from the row above and one solar module 106 from the row below skip rail splice 100.

Figure 11:
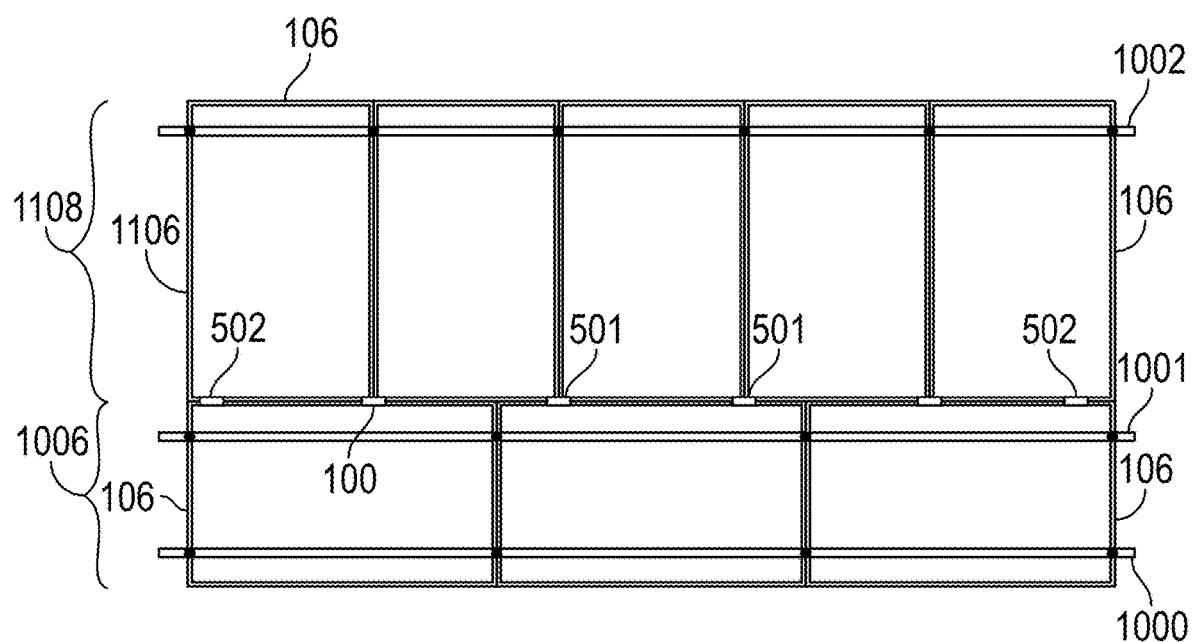

FIG. 11 depicts an example embodiment of an array of solar modules of mixed landscape 1006 and portrait 1108 orientations. Between the rows of solar modules 106 there is a row of skip rail spices 100 which may have two skip rail splices 100 in row-end splice locations 502 and multiple skip rail splices 100 in mid-row splice locations 501. Each of these skip rail splices 100 may attach to two, three, or four solar modules 106. In this example embodiment, a first rail 1000 is positioned within the first half of a solar module 106, and the second rail 1001 is positioned substantially parallel with the first rail 1000 in the second half of solar module 106. For the second row of solar modules 106 in portrait 1108 orientation, a third rail 1002 is positioned substantially parallel to the first two rails, in a position that aligns it in the farthest half of the edge of a row of solar modules 106 above the first row of solar modules 106. In this example embodiment, there is no rail positioned in the lower half of the solar modules 106 in the second row of the array. The spacing between the second rail 1001 and the third rail 1002 generally corresponds to the length of the longer edge 1106 of the second row of solar modules. As depicted, the skip rail splices 100 that are positioned in mid-row splice locations 501 are positioned to connect one solar module 106 in the solar module row below the skip rail splice 100 and two solar modules 106 in the solar module row above the skip rail splice 100. Skip rail splices 100 that are positioned in row-end splice locations 502 connect one solar module 106 from the row above and one solar module 106 from the row below skip rail splice 100.

Unless specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A mounting system for solar modules, the system comprising:
    a pair of mounting rails attached to a roof surface and used to support a first solar module having a first edge and a second edge opposite the first edge, wherein the pair of mounting rails extends in parallel along an interior portion of the first solar module between the first edge and the second edge; and
    an edge splice configured to connect the second edge of the first solar module to a first edge of a second solar module supported by a single additional mounting rail, wherein the edge splice is laterally displaced from the pair of mounting rails and the single additional mounting rail.

2. The mounting system of claim 1, further comprising:
    a second additional mounting rail attached to the roof surface, laterally displaced from the single additional mounting rail, and parallel to the single additional mounting rail, wherein the second additional mounting rail is positioned along an interior portion of a third solar module; and
    a second edge splice laterally displaced from the single additional mounting rail and that connects a first edge of the third solar module to a second edge of the second solar module.

3. The mounting system of claim 1, wherein the first edge of the first solar module and the first edge of the second solar module are parallel to the pair of mounting rails.

4. The mounting system of claim 1, wherein a first mounting rail of the pair of mounting rails is positioned within a first half portion of the first solar module, wherein a second mounting rail of the pair of mounting rails is positioned within a second half portion of the first solar module, and wherein the single additional mounting rail is positioned within a half portion of the second solar module that is farthest from the first solar module.

5. The mounting system of claim 1, wherein a first distance between the pair of mounting rails corresponds to a fraction of a length of a third edge of the first solar module, the third edge of the first solar module orthogonal to the first edge of the first solar module.

6. The mounting system of claim 1, wherein a length of the first edge of the first solar module is different than a length of the first edge of the second solar module.

7. The mounting system of claim 1, wherein the further comprising:
    a third solar module that has a first edge and a second edge, wherein the first edge of the third solar module is substantially aligned with the first edge of the first solar module;
    a fourth solar module with a first edge and a second edge, wherein the second edge of the fourth solar module is substantially aligned with the second edge of the second solar module; and
    a second edge splice that connects the second edge of the first solar module and the second edge of the third solar module to the first edge of the second solar module and the first edge of the fourth solar module.

8. The mounting system of claim 1, further comprising:
a third solar module with a first edge that is substantially aligned with the first edge of the first solar module; and
a second edge splice that connects the first edge of the second solar module to a second edge of the third solar module.

9. The mounting system of claim 1, wherein the single additional mounting rail is configured to support the second solar module along an interior portion of the second solar module between the first edge and a second edge of the second solar module.

10. A mounting system for solar modules, the system comprising:
a pair of mounting rails attached to a roof surface and used to support a first row of one or more solar modules each having a first edge and a second edge opposite the first edge, wherein the pair of mounting rails extends in parallel along a respective interior portion of each of the first row of solar modules between the respective first edge and the respective second edge of each of the first row of solar modules;
a single additional mounting rail that supports a second row of one or more solar modules, wherein the single additional mounting rail is positioned along a respective interior portion of each of the second row of solar modules; and
an end-row edge splice configured to connect a solar module in the first row to a solar module at an end of the second row, the end-row edge splice laterally displaced from the pair of mounting rails and the single additional mounting rail.

11. The system of claim 10, further comprising a mid-row edge splice configured to connect a solar module located mid-row within the first row to two solar modules of the second row.

12. The system of claim 10, wherein each of the one or more solar modules in the second row has a first edge and a second edge opposite the first edge, wherein a third edge of at least one of the solar modules of the first row is aligned to a third edge of at least one of the solar modules of the second row, the third edge of the at least one solar module of the first row being orthogonal to the respective first edge of the at least one solar module of the first row.

13. The system of claim 10, wherein third edges of solar modules of the first row are offset from corresponding third edges of solar modules of the second row.

14. The system of claim 10, further comprising a second single additional mounting rail that supports a third row of one or more solar modules.

15. The system of claim 10, wherein the solar modules of the first row are in a different orientation than the solar modules of the second row.

16. The system of claim 10, wherein the first edge of one of the solar modules in the first row is parallel with the pair of mounting rails, the first edge having a first length, and wherein one of the solar modules in the second row has a third edge that is parallel with the pair of mounting rails, the third edge of the solar module in the second row having a different length than the first edge of the solar module in the first row.

17. A method for installing solar modules using a mounting system, the method comprising:
attaching a pair of mounting rails and a single additional rail to a roof surface with a plurality of mounts;
attaching a first solar module to the pair of mounting rails using clamps, wherein the first solar module has a first edge and a second edge opposite of the first edge, and wherein the pair of mounting rails are positioned along an interior portion of the first solar module between the first edge and the second edge;
connecting the second edge of the first solar module to a first edge of a second solar module using an edge splice, wherein the edge splice is laterally displaced from the pair of mounting rails; and
attaching the second solar module to the single additional mounting rail, wherein the single additional mounting rail is positioned along an interior portion of the second solar module between the first edge and a second edge of the second solar module.

18. The method of claim 17, further comprising:
attaching a second additional mounting rail to the roof surface, the second additional mounting rail laterally displaced from the single additional mounting rail and parallel to the single additional mounting rail;
connecting a second edge of the second solar module to a first edge of a third solar module using a second edge splice; and
attaching the third solar module to the fourth second additional mounting rail.

19. The method of claim 17, wherein the single additional mounting rail is positioned within a half portion of the second solar module that is farthest from the first solar module.

20. The method of claim 17, wherein a distance between the pair of mounting rails is a fraction of a length of a third edge of the first solar module, the third edge of the first solar module orthogonal to the first edge of the first solar module.

21. The method of claim 17, further comprising:
attaching a third solar module to the pair of mounting rails; and
connecting a second edge of the third solar module to the first edge of the second solar module using a second edge splice.

22. The method of claim 21, further comprising attaching the third solar module to the pair of mounting rails along an interior portion of the third solar module between a first edge and the second edge of the third solar module.

23. The method of claim 17, wherein a length of the first edge of the first solar module is different than a length of the first edge of the second solar module.

24. The method of claim 17, further comprising connecting the second edge of the first solar module to the first edge of the second solar module using a second edge splice.

* * * * *

EX PARTE REEXAMINATION CERTIFICATE (13045th)

United States Patent
Stephan et al.

(10) Number: US 11,848,636 C1
(45) Certificate Issued: Sep. 30, 2025

(54) SKIP RAIL SYSTEM

(71) Applicant: PEGASUS SOLAR, INC., Richmond, CA (US)

(72) Inventors: Erich Kai Stephan, Richmond, CA (US); Glenn Harris, Sausalito, CA (US); Nicholas Wenzel, Richmond, CA (US); Peter Wilke, Richmond, CA (US)

(73) Assignee: PEGASUS SOLAR, INC., Richmond, CA (US)

Reexamination Request:
No. 90/019,642, Aug. 30, 2024

Reexamination Certificate for:
Patent No.: 11,848,636
Issued: Dec. 19, 2023
Appl. No.: 16/889,635
Filed: Jun. 1, 2020

Related U.S. Application Data

(60) Provisional application No. 62/857,176, filed on Jun. 4, 2019.

(51) Int. Cl.
*H02S 20/23* (2014.01)
*F24S 25/61* (2018.01)
*F24S 25/67* (2018.01)

(52) U.S. Cl.
CPC .............. *H02S 20/23* (2014.12); *F24S 25/61* (2018.05); *F24S 25/67* (2018.05)

(58) Field of Classification Search
None
See application file for complete search history.

(56) References Cited

To view the complete listing of prior art documents cited during the proceeding for Reexamination Control Number 90/019,642, please refer to the USPTO's Patent Electronic System.

*Primary Examiner* — Terrence R Till

(57) ABSTRACT

A multi-rail system for mounting solar modules to a surface, such as a roof, uses two rails to support a first row of solar modules, and a single rail to support each subsequent row of solar modules. Splices connect edges of solar modules between rows, providing support along one edge of the solar modules for the subsequent rows.

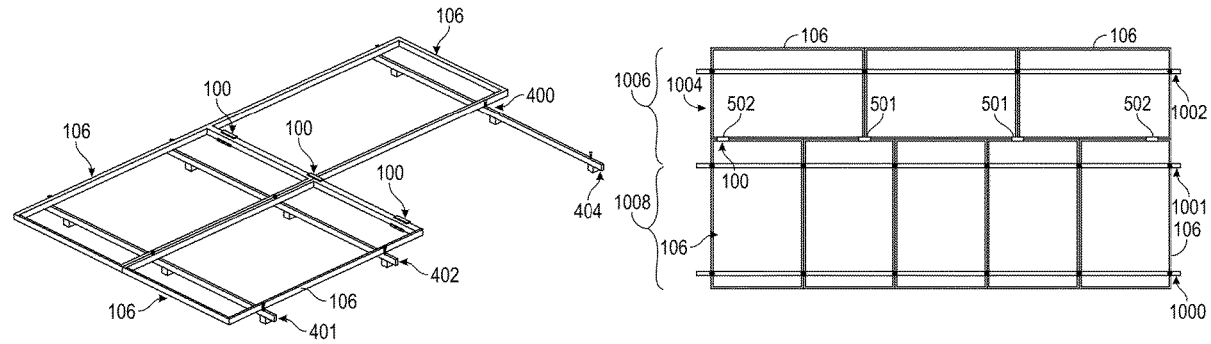

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-17 and 19-24 is confirmed.

Claim 18 is determined to be patentable as amended.

New claims 25-45 are added and determined to be patentable.

25. *The mounting system of claim 1, wherein the second solar module is above the first solar module, wherein the pair of mounting rails further extend along an interior portion of a third solar module that has a first edge and a second edge aligned with the first edge and the second edge of the first solar module.*

26. *The mounting system of claim 25, wherein the edge splice is further configured to connect the second edge of the third solar module to the first edge of a second solar module.*

27. *The mounting system of claim 1, wherein the edge splice is configured to connect to the second edge of the first solar module along the entire length of the edge splice.*

28. *The mounting system of claim 27, wherein the single additional mounting rail further supports a third solar module with a first edge and a second edge substantially aligned with the first edge and the second edge of the second solar module and wherein the edge splice is configured to connect to the first edge of the third solar module.*

29. *The mounting system of claim 1, wherein the first solar module is secured to the pair of mounting rails by at least one clamp on an edge of the first solar module other than the first edge or the second edge and wherein the second solar module is secured to the single additional mounting rail by at least one clamp on an edge of the second solar module other than the first or second edge.*

30. *The mounting system of claim 1, wherein a vertical member of the edge splice is parallel with the second edge of the first solar module.*

31. *The mounting system of claim 30, wherein the first solar module and the second solar module are offset along the length of the vertical member of the edge splice.*

32. *The mounting system of claim 31, wherein the single additional mounting rail further supports a third solar module with a first edge and a second edge substantially aligned with the first edge and the second edge of the second solar module and wherein the edge splice is configured to connect to the first edge of the third solar module.*

33. *The mounting system of claim 4, wherein a vertical member of the edge splice is parallel with the second edge of the first solar module.*

34. *The mounting system of claim 33, wherein the first solar module and the second solar module are offset along the length of the vertical member of the edge splice.*

35. *The mounting system of claim 34, wherein the single additional mounting rail further supports a third solar module with a first edge and a second edge substantially aligned with the first edge and the second edge of the second solar module and wherein the edge splice is configured to connect to the first edge of the third solar module.*

36. *The method of claim 17, wherein the second solar module is above the first solar module, wherein the pair of mounting rails are further positioned along an interior portion of a third solar module that has a first edge and a second edge aligned with the first edge and the second edge of the first solar module.*

37. *The method of claim 36, wherein the edge splice connects the second edge of the third solar module to the first edge of a second solar module.*

38. *The method of claim 17, wherein the edge splice connects to the second edge of the first solar module along the entire length of the edge splice.*

39. *The method of claim 38, attaching a third solar module to the single additional mounting rail, wherein the third solar module has a first edge and a second edge substantially aligned with the first edge and the second edge of the second solar module and wherein the edge splice connects to the first edge of the third solar module.*

40. *The method of claim 17, connecting the clamps to an edge of the first solar module other than the first edge or the second edge and attaching the second solar module to the single additional mounting rail by at least one additional clamp connecting to an edge of the second solar module other than the first or second edge.*

41. *The method of claim 17, wherein a vertical member of the edge splice is parallel with the second edge of the first solar module.*

42. *The method of claim 41, wherein the first solar module and the second solar module are offset along the length of the vertical member of the edge splice.*

43. *The method of claim 42, wherein a third solar module is attached to the single additional mounting rail, wherein the third solar module has a first edge and a second edge substantially aligned with the first edge and the second edge of the second solar module and wherein the edge splice connects to the first edge of the third solar module.*

44. *The method of claim 17, wherein the first edge of the second solar module is inserted into the edge splice at an angle relative to a bottom flange of the edge splice.*

45. *The method of claim 44, wherein the edge splice secures the second module when the second module is lowered onto the single additional mounting rail.*

\* \* \* \* \*